Figure 1:
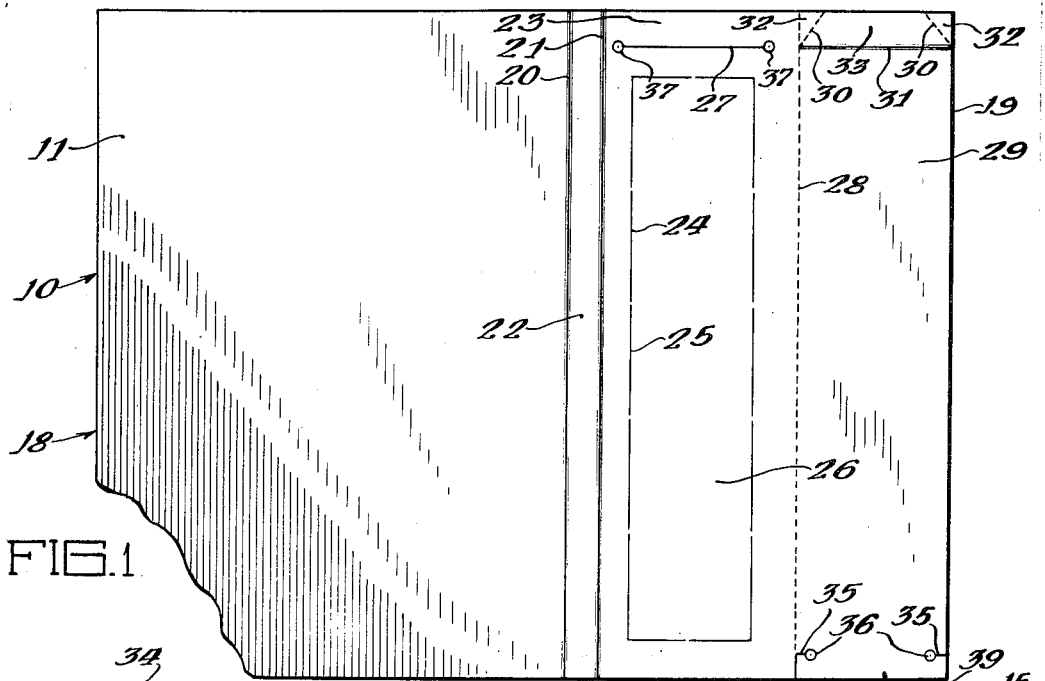

Aug. 17, 1965 H. KOPEL 3,200,514
INSTRUCTIONAL DEVICE
Filed Nov. 30, 1962 2 Sheets-Sheet 1

Inventor:
Harold Kopel
By Hofgren, Brady, Wegner,
Allen & Stellman
Attorneys

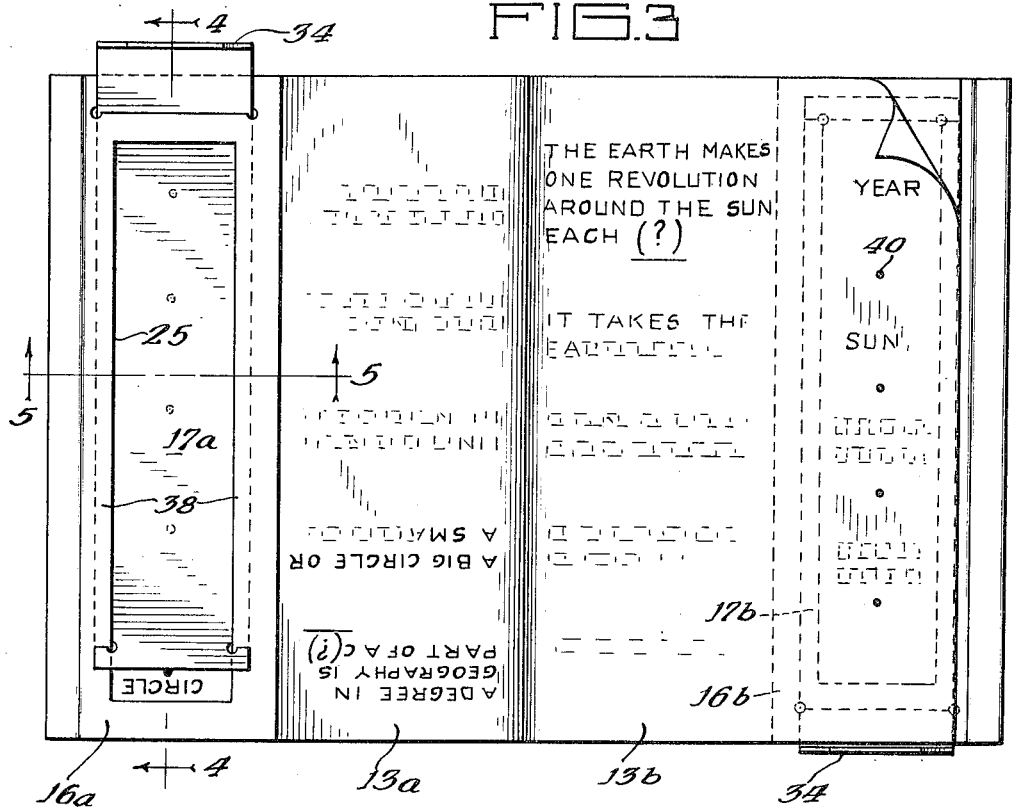
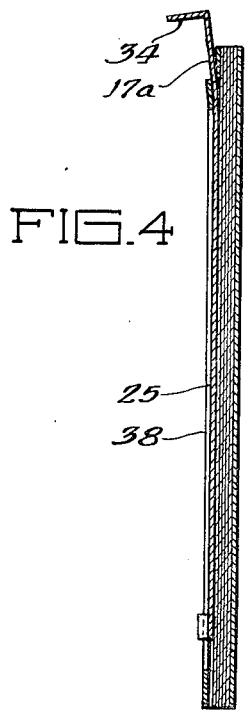
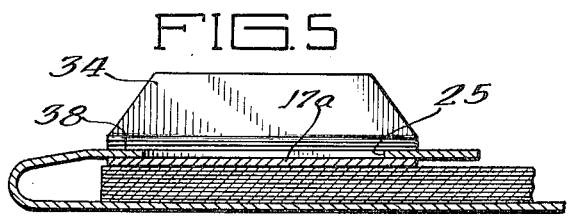

United States Patent Office 3,200,514
Patented Aug. 17, 1965

3,200,514
INSTRUCTIONAL DEVICE
Harold Kopel, Chicago, Ill., assignor to Esquire, Inc.,
a corporation of Delaware
Filed Nov. 30, 1962, Ser. No. 241,344
7 Claims. (Cl. 35—9)

This invention relates to instructional devices and in particular to a device for teaching, requiring active response by a user.

A conventional method of teaching has been to provide a learner with a book containing the information to be learned. After reading the book, the learner is quizzed as to what he has learned therefrom. By discussing the results of the quiz, an attempt is made to remedy the deficiencies in the learning achieved by the student in reading the book. While this mehod of teaching has recognized limitations and deficiences, it has been followed for many years for want of more effcient and satisfactory teaching methods.

The present invention comprehends a novel approach to the problem of instruction utilizing book material in a novel manner, whereby active participation and response by the learner is required at all stages of the instruction. A substantial increase in the efficiency of learning has been found to result from the employment of the instructional technique comprehended thereby.

Thus, a principal object of the invention is the provision of a new and improved instructional means.

A further object of the present invention is to provide a new and improved instructional device including a carrier, first means on the carrier for visually indicating a concept to be learned by a user and requiring a preselected response by the user, second means on the carrier for visually indicating the preselected response, a guide movably associated with the carrier to extend removably adjacent the second means, and means movably carried by the guide for selectively covering and exposing the second means.

Another object of the present invention is the provision of such an instructional device comprising a booklet wherein the concepts to be learned are indicated on the several pages of the booklet, with the responses, which may be answers to questions or indications of missing portions in the indicated concepts, located in a preselected relationship to the indicated concepts, the guide means comprising a flap connected to a cover page of the booklet for selectively overlying the portion of the pages carrying the responses so that the user may selectively cover and expose the responses by suitable manipulation of the covering means.

Still another object of the invention is the provision of such an instructional booklet wherein the covering means comprises a slider slidably carried by the guide flap.

Still another object of the invention is the provision of such an instructional booklet having a guide flap and slider assembly on each of the front and rear covers thereof for selective covering and exposure of the response means on both the lefthand and righthand pages of the booklet.

A yet further object of the invention is the provision of such an instructional booklet wherein the concept and response indications on the lefthand pages of the booklet are inverted relative to the concept and response indications on the righthand pages of the booklet, with the response means being disposed adjacent the outer edges of the respective pages.

A further object of the invention is the provision of such an instructional booklet wherein the cover, guide flap, and slider means are originally intergrally formed from a single sheet of book material.

Figure 2:
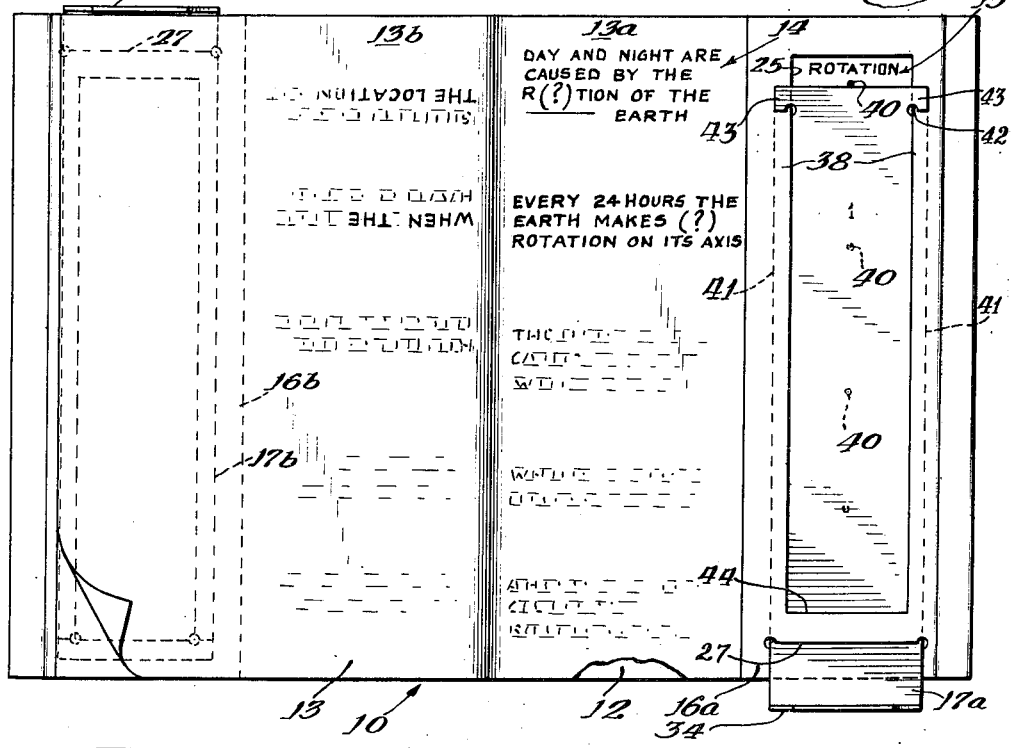

Other objects and advantages of the invention will be apparent from the following description taken in connection with the accompanying drawings wherein:

FIGURE 1 is a front elevation of a front cover portion of an instructional booklet embodying the invention, with the guide flap and slider portions thereof blanked on the righthand extension thereof, a portion of the cover being broken away to facilitate the illustration;

FIGURE 2 is a front elevation of the booklet opened to expose a pair of the inner pages thereof, the righthand guide flap and slider assembly being positioned to expose the response to the uppermost concept on the righthand page of the pair while covering the responses to the other concepts on the righthand page, the lefthand guide flap and slider assembly being disposed under the lefthand pages as not in use in this arrangement of the booklet;

FIGURE 3 is a front elevation of the instructional booklet inverted from the position of FIGURE 2, whereby the lefthand pages of FIGURE 2 comprise the righthand pages in FIGURE 3, the booklet being illustrated in the arrangement thereof prior to the withdrawal of the now righthand guide flap and slider assembly from beneath the now righthand pages to overlie the righthand pages, and with the now lefthand guide flap and slider assembly still overlying the now lefthand pages;

FIGURE 4 is a longitudinal section thereof taken substantially along the line 4—4 of FIGURE 3; and FIGURE 5 is a fragmentary transverse section thereof taken substantially along the line 5—5 of FIGURE 3.

In the exemplary embodiment of the invention as disclosed in the drawing, an instructional device generally designated 10 is shown to comprise a booklet having a front page, or cover, 11, a rear page, or cover, 12, and a plurality of intermediate pages 13 bound in the conventional manner between the front and rear covers. As shown in FIGURE 2, when the book is opened as to pages 13a and 13b, a series of instructional concepts 14 are exposed to view, the concepts printed on the lefthand page 13b being printed upside down relative to the concepts printed on the righthand page 13a. Also, on the respective pages are provided responses 15 which correspond to the instructional concepts 14. Viewing of the responses 15 is selectively controlled by means of a guide flap 16a and slider 17a which as shown in FIGURE 2 overlie the outer edge of the righthand page 13a to selectively cover and expose the responses. As shown in dotted lines in FIGURE 2, a second guide flap 16b and cooperating slider 17b are provided on the front cover 11.

As shown in FIGURE 1, the guide flap and slider elements may be formed integrally with the booklet cover. More specifically, the sheet 18 from which the cover 11 is formed may include an extension portion 19. Portion 19 is joined to cover portion 11 by a first creased edge portion 20 defining the righthand edge of the cover 11. The extension 19 includes a second creased portion 21 spaced slightly to the right of creased edge portion 20 to define therebetween a spacer portion 22. Rightwardly from creased portion 21, the extension 19 defines the guide flap blank portion 23 which is provided with scoring 24 defining an opening 25 upon removal of the blank portion 26 within the scoring 24. The flap blank portion 23 further includes a transverse slit 27 adjacent the upper end of the flap blank.

The righthand edge of the flap blank portion 23 is defined by a perforated line 28 permitting the righthand end 29 of the extension portion 19 to be torn from the flap blank portion 23 and define the slider 17b. As shown in FIGURE 1, the slider portion 29 is further provided with a pair of diagonally upwardly converging perforations 30 at the upper end thereof and a creased line 31 at the lower end of the perforations 30. The triangular portions 32 upwardly of the perforations 30 may thusly be removed from the blank portion 29 and the upper end 33 folded from the flat plane of the slider portion 29 to define a pull tab 34, as best seen in FIGURES 2 and 3. Adjacent the lower end, the slider blank portion 29 is provided with a pair of short slits 35 extending inwardly from the opposite side edges thereof to a circular scored portion 36. The width of the slider portion 29 is made to be slightly greater than the width of the opening 25 of the guide flap portion 23, while the spacing of the centers of the scored openings 36 is made to be substantially equal thereto. The opposite ends of the slit 27 may be defined by similar scored openings 37 and the spacing between the centers of scored openings 37 is substantially equal to the width of the slider portion 29.

The booklet 10 may be originally provided with the extension portion 19 substantially as shown in FIGURE 1, but folded along the creased line 20 to lie against the inner surface of the cover portion. To arrange the booklet for use, the user merely tears off the slider portion along the perforated line 28, removes the triangular portions 32 by tearing along the perforated lines 30, and inserts the upper end of the slider through the opening 25. The opposite edges 38 of the guide flap portion 23 defining the opening 25 are then caused to extend through the slits 35, whereby the end portion 39 is disposed in front of the guide flap as shown in FIGURE 2. The opposite end of the slider is then passed through the slit 27 to extend from behind the guide flap to in front of the lower portion of the flap, as shown in FIGURE 2. The tab 34 is then folded upwardly to define a handle for manipulation of the slider.

Thus, as best seen in FIGURE 2 of the drawing, the edge portions 41 of the slider 17a are each provided with a stop means, or shoulder, 42 defined by the lower edge of the upper corner portions 43 of the slider which overlie the edges 38 of the guide 16a. The downward movement of the slider outwardly through the slit 27 is limited by the engagement of the shoulders 42 with a cooperating stop means, or shoulder, 44, herein defined by the lower transverse edge of the guide opening 25.

The booklet 10, as shown in FIGURES 2 and 3, may be provided with guide flap and slider assemblies on each of the front and rear cover pages so that both the righthand pages and lefthand pages may be utilized therewith. As shown in FIGURE 2, the guide flap 16a is folded over the righthand edge of the righthand pages 13a to overlie the responses 15 printed adjacent the righthand edge of these pages. The instructional concepts 14 are printed to the left of the responses and are thusly exposed. In using the booklet, the user reads the concept 14 and mentally determines the correct response required. The slider 17a is positioned in the uppermost position at this time thusly covering the responses 15. To determine whether his response to the first instructional concept was correct, the user slides the slider downwardly to expose the uppermost response 15, as shown in FIGURE 2. To assist the user in positioning the slider, indicia 40 are provided, herein comprising dots disposed one each between the respective responses. Thus, the user merely slides slider 17a until the next indicium is exposed. After reading the next instructional concept and mentally determining the response required, the user slides the slider 17a further downwardly to the next indicium whereupon the next response is exposed to the user for comparison with his mental response. When the last response is viewed by the user to complete his study of the particular page, the user then returns the slider to its uppermost position fully closing the opening 25 and slides the page from under the guide flap 16a to expose the next righthand page for subsequent reading and viewing of the responses in the manner discussed above.

As indicated in FIGURES 2 and 3, the instructional concepts and responses on the lefthand pages 13b are printed upside down relative to those on the righthand pages. Thus, in utilizing the lefthand pages, the user merely turns the booklet upside down to the position of FIGURE 3 whereupon the lefthand pages 13b in effect become the righthand pages of the booklet permitting the guide flap 16b and slider 17b to be utilized in the same manner relative to pages 13b as were guide flap 16a and slider 17a in conjunction with pages 13a.

By means of the instructional device 10, learning is facilitated. The requirement of active participation in determining a suitable response correlated with the instructional concept read by the user provides an active mental participation requirement assuring accurate learning and comprehension of the concepts being taught. By providing a means for determining the correctness of the user's response, the learning program may be carried out in step-by-step fashion in a simple and effective manner. It has been found that such facilitated determination of the correct response immediately after a user determines for himself his own response reinforces his learning and substantially increases the rate thereof, as well as the retention of the material learned. Still further, the novel presentation provided by the instructional device 10 maintains the user's interest and mental acuteness during the learning periods, thereby further facilitating the learning process.

The instructional device 10 may be formed integrally with the cover material of the booklet, and the device is extremely simple and economical. The arrangement of the slider and guide flap is such as to maintain the association thereof with the booklet, thereby effectively precluding loss of the elements.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A device comprising: a booklet including first and second pages; first means on said first page for visually indicating a concept to be learned by a user and requiring a preselected response by the user; second means on said first page for visually indicating the preselected response; a guide movably integrally associated with said second page to extend removably adjacent said second means, said second page and said guide being formed of a continuous piece of stock; and means formed as an extension of said guide from said continuous piece of stock and including separation means at which said extension is arranged to be separated from said guide and to be formed into covering means installable movably on said guide for selectively covering and exposing said second means.

2. The device of claim 1 wherein said guide and covering means include cooperating slide means providing slidable adjustment of the position of said covering means relative to the response means upon installation of said covering means on said guide, and cooperating means precluding the removal of the covering means from said guide when said covering means is installed on said guide.

3. The device of claim 1 wherein said second page is futher provided with a spacer hingedly connecting said guide thereto, said spacer being formed of said continuous piece of stock to have a thickness substantially equal to that of said guide.

4. The device of claim 1 wherein said guide is provided with a blank portion and means providing for facilitated separation of the blank portion from the guide to define the means for cooperation with the covering means to provide for installation of the covering means on the guide.

5. An instructional device comprising: a carrier; first means on said carrier for visually indicating a concept to be learned by a user and requiring a preselected response by the user; second means on said carrier for visually indicating the preselected response; a guide movably associated with said carrier to extend removably adjacent said second means; and means movably carried by said guide for selectively covering and exposing said second means while allowing said first means to be exposed at all times, said guide being provided with an opening having parallel spaced edges and said covering means comprising a panel extending across said opening and having edge portions slidably engaging said guide edges.

6. An instructional device comprising: a carrier; first means on said carrier for visually indicating a concept to be learned by a user and requiring a preselected response by the user; second means on said carrier for visually indicating the preselected response; a guide movably associated with said carrier to extend removably adjacent said second means; and means movably carried by said guide for selectively covering and exposing said second means while allowing said first means to be exposed at all times, said guide being provided with an opening having parallel spaced edges and said covering means comprising a panel extending across said opening and having edge portions slidably engaging said guide edges, said guide further having a slit adjacent one end of said opening and extending parallel to the direction between said edges, and said covering means further having a portion extending through said slit for manipulation by the user.

7. An instructional device comprising: a carrier; first means on said carrier for visually indicating a concept to be learned by a user and requiring a preselected response by the user; second means on said carrier for visually indicating the preselected response; a guide movably associated with said carrier to extend removably adjacent said second means; and means movably carried by said guide for selectively covering and exposing said second means while allowing said first means to be exposed at all times, said guide being provided with an opening having parallel spaced edges and said covering means comprising a panel extending across said opening and having edge portions slidably engaging said guide edges, said edge portions of the covering means including means adjacent one end of the covering means defining a first shoulder extending transversely to said spaced edges, and said guide being provided adjacent one end of said opening with means defining a second shoulder disposed for engagement by said first shoulder to limit the slidable movement of said covering means relative to said guide.

References Cited by the Examiner
UNITED STATES PATENTS

| | | | |
|---|---|---|---|
| 651,713 | 6/00 | Hurlbut et al. | 281—3 |
| 1,492,932 | 5/24 | Orrell | 281—31 |
| 2,879,608 | 3/59 | Watkins | 35—48.1 X |
| 2,986,822 | 6/61 | Balchuns | 35—35.2 |
| 3,032,892 | 5/62 | Palmer | 35—9 |
| 3,054,195 | 9/62 | Palmer | 35—9 |
| 3,071,395 | 1/63 | Essman | 281—42 |
| 3,111,774 | 11/63 | Schade | 35—9 |
| 3,111,775 | 11/63 | Schade | 35—9 |
| 3,125,813 | 3/64 | Schade | 35—9 |

JEROME SCHNALL, *Primary Examiner.*

GEORGE NINAS, Jr., LAWRENCE CHARLES, *Examiners.*